(12) United States Patent
Balachandran et al.

(10) Patent No.: US 10,213,838 B2
(45) Date of Patent: Feb. 26, 2019

(54) SILVER NANOWIRE PRODUCTION METHOD

(71) Applicants: THE UNIVERSITY OF SHIGA PREFECTURE, Shiga (JP); DOWA HOLDINGS CO., LTD., Tokyo (JP)

(72) Inventors: Jeyadevan Balachandran, Shiga (JP); Jhon Lehman Cuya Huaman, Shiga (JP); Daisuke Kodama, Tokyo (JP)

(73) Assignees: THE UNIVERSITY OF SHIGA PREFECTURE, Shiga (JP); DOWA HOLDINGS CO., LTD., Tokyo (JP)

( * ) Notice: Subject to any disclaimer, the term of this patent is extended or adjusted under 35 U.S.C. 154(b) by 190 days.

(21) Appl. No.: 15/111,500

(22) PCT Filed: Jan. 19, 2015

(86) PCT No.: PCT/JP2015/051235
§ 371 (c)(1),
(2) Date: Jul. 14, 2016

(87) PCT Pub. No.: WO2015/108183
PCT Pub. Date: Jul. 23, 2015

(65) Prior Publication Data
US 2016/0332234 A1 Nov. 17, 2016

(30) Foreign Application Priority Data
Jan. 20, 2014 (JP) .................................. 2014-008052

(51) Int. Cl.
*B22F 9/24* (2006.01)
*B22F 1/00* (2006.01)
(Continued)

(52) U.S. Cl.
CPC .............. *B22F 9/24* (2013.01); *B22F 1/0025* (2013.01); *B22F 1/0062* (2013.01);
(Continued)

(58) Field of Classification Search
CPC .. B22F 7/04; B22F 1/0003; B22F 3/02; B22F 9/24; B22F 1/0025; B22F 1/0062;
(Continued)

(56) References Cited

U.S. PATENT DOCUMENTS

2005/0056118 A1 3/2005 Xia et al.
2008/0003130 A1 1/2008 Xia et al.
(Continued)

FOREIGN PATENT DOCUMENTS

JP 2006-233252 9/2006
JP 2013-234341 11/2013
(Continued)

OTHER PUBLICATIONS

C. Ducamp-Sanguesa et al., "Synthesis and . . . Uniform Shape", Journal of Solid State Chemistry, 100, 272-280 (1992).

*Primary Examiner* — Keith Walker
*Assistant Examiner* — Ryan L Heckman
(74) *Attorney, Agent, or Firm* — Clark & Brody

(57) ABSTRACT

A production method of silver nanowires exhibits a yield enhancement effect for a protective agent other than PVP. The method for producing silver nanowires includes depositing a silver linear structure, which is referred to as silver nanowires, in an alcohol solvent having a silver compound, a halogen compound, and an organic protective agent dissolved therein. A deposition reaction of silver is performed in a state where aluminum nitrate is further dissolved in the solvent, the total amount of aluminum nitrate dissolved in the solvent being from 0.01 to 0.50 in terms of Al/Ag molar ratio with respect to the total amount of the silver compound. The organic protective agent is, for example, one containing one or more kinds of alkylated PVP and a PVP-PVA graft copolymer.

5 Claims, 6 Drawing Sheets

Example 1

(51) Int. Cl.
*B82Y 30/00* (2011.01)
*B82Y 40/00* (2011.01)

(52) U.S. Cl.
CPC ............ *B22F 1/0074* (2013.01); *B82Y 30/00* (2013.01); *B82Y 40/00* (2013.01); *B22F 2009/245* (2013.01); *B22F 2301/255* (2013.01); *B22F 2998/10* (2013.01)

(58) Field of Classification Search
CPC .............. B22F 1/0074; B22F 2009/245; B22F 2301/255; B22F 2998/10; B82Y 30/00; B82Y 40/00
See application file for complete search history.

(56) References Cited

U.S. PATENT DOCUMENTS

2009/0196788 A1* 8/2009 Wang ................. B22F 9/24
420/501
2011/0081546 A1* 4/2011 Kim .................. B22F 1/0022
428/372
2012/0301350 A1* 11/2012 Whitcomb ............... B22F 9/24
420/501

FOREIGN PATENT DOCUMENTS

WO 2011/071167 6/2011
WO 2012/112239 8/2012

* cited by examiner

[Fig.1]
Example 1
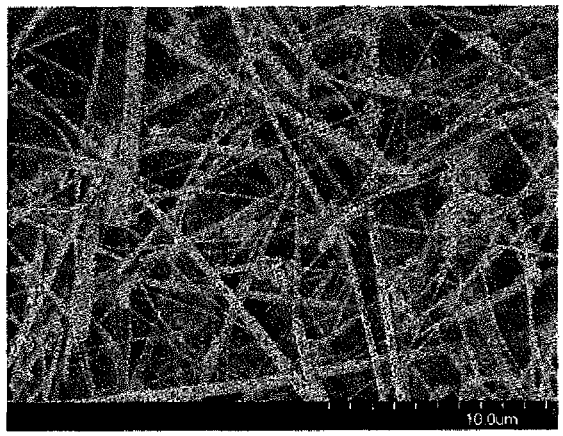
[Fig.2]
Example 2
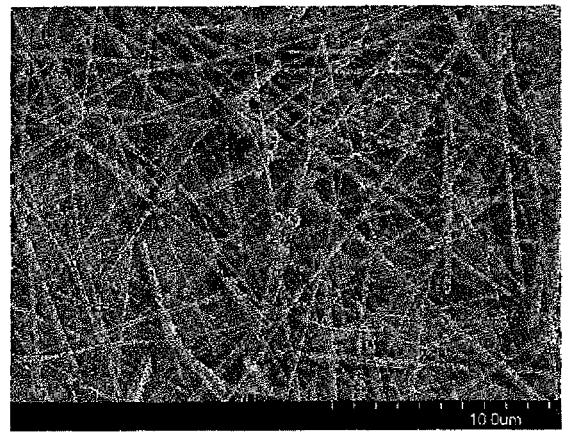
[Fig.3]
Example 3
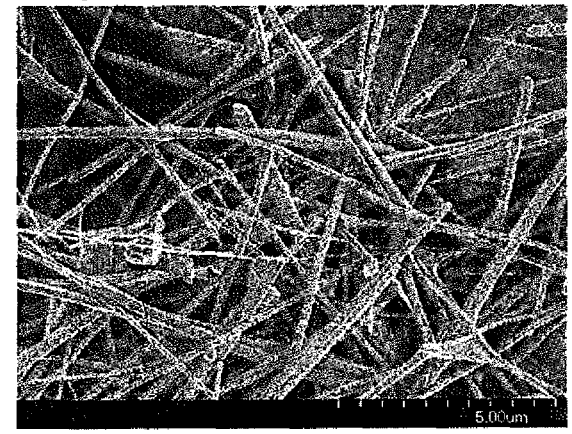

[Fig.4]
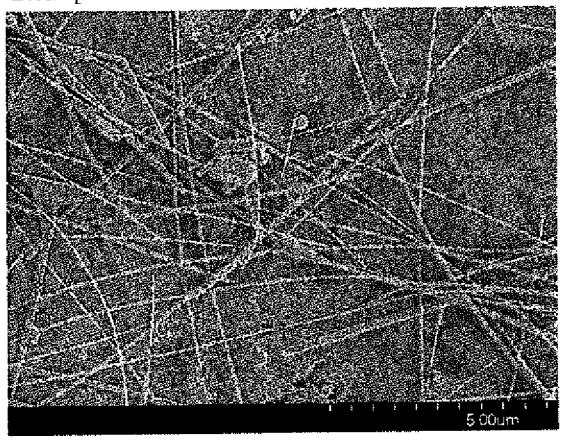
Example 4
[Fig.5]
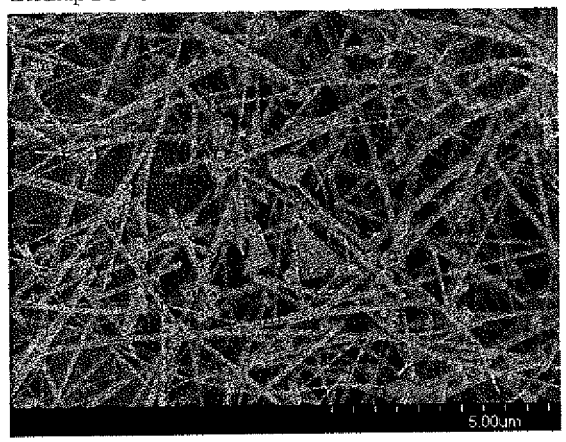
Example 5
[Fig.6]
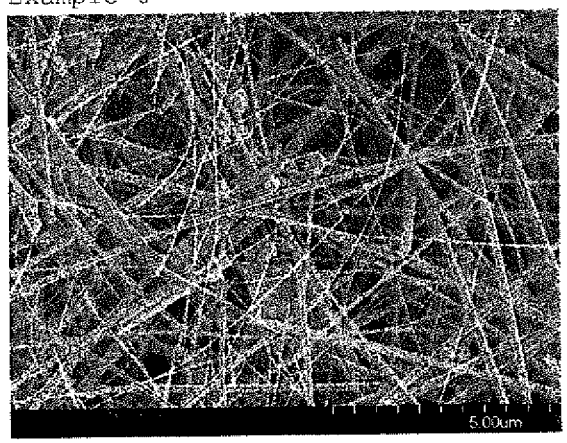
Example 6

[Fig.7]
Example 7
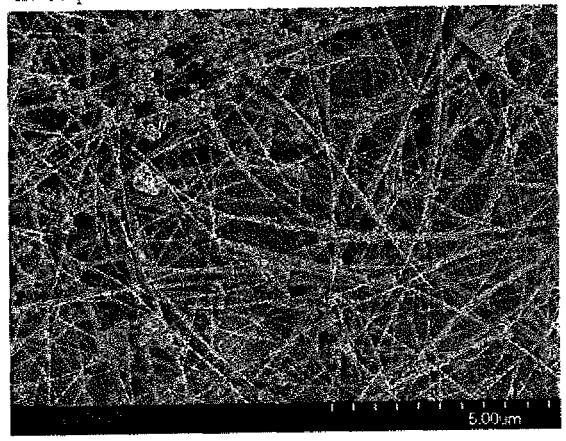
[Fig.8]
Comparative Example 1
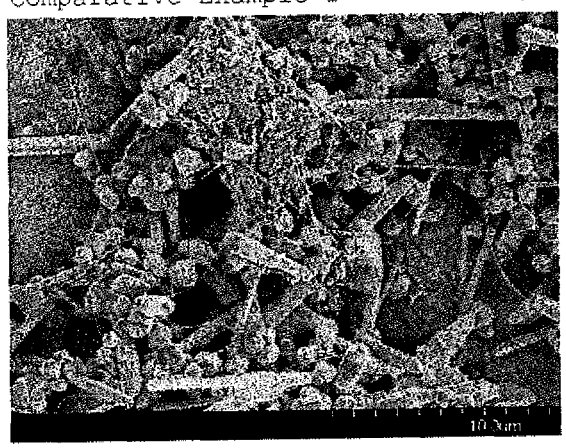
[Fig.9]
Comparative Example 2
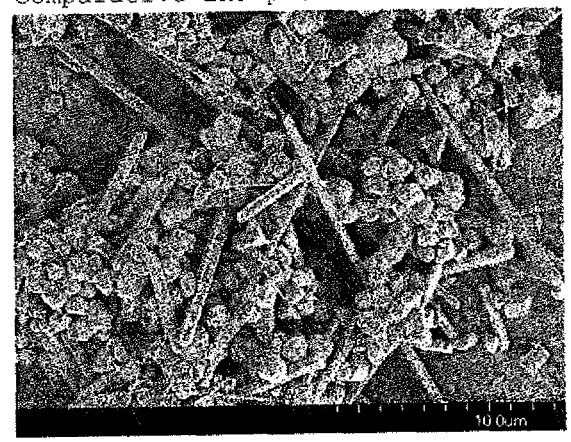

[Fig.10]
Comparative Example 3
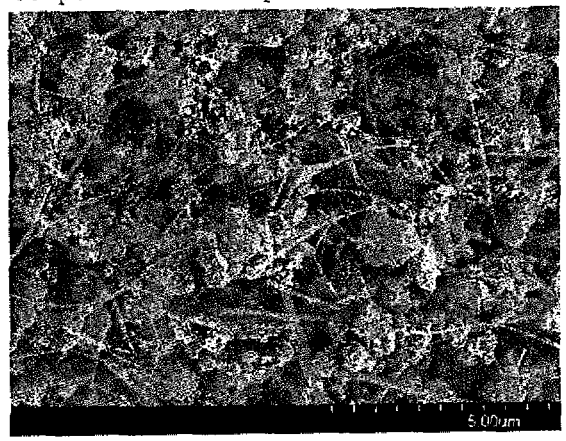
[Fig.11]
Comparative Example 4
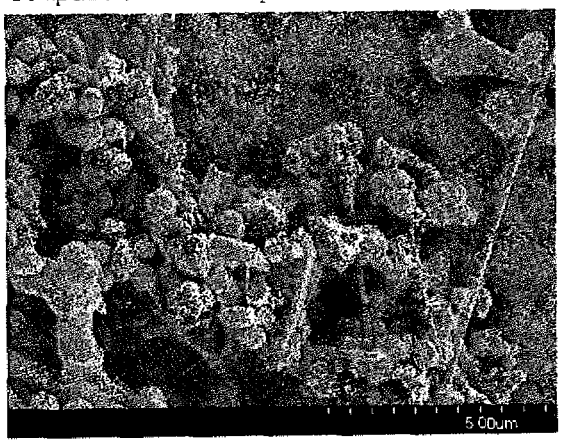
[Fig.12]
Comparative Example 5
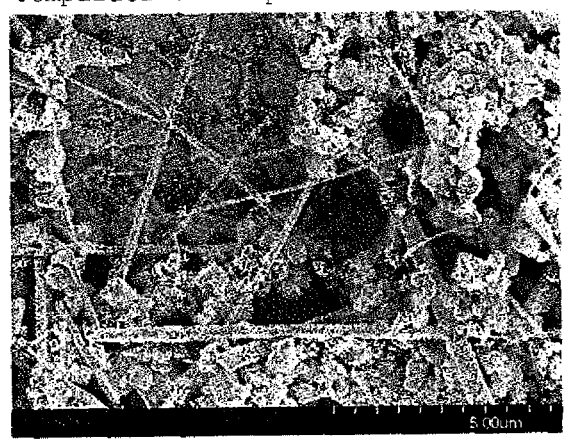

[Fig.13]
Comparative Example 6
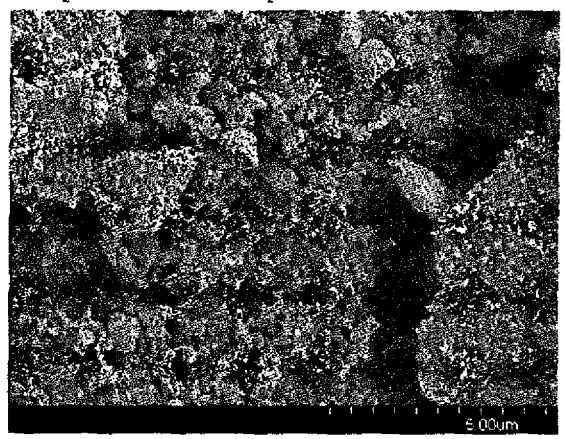
[Fig.14]
Example 8
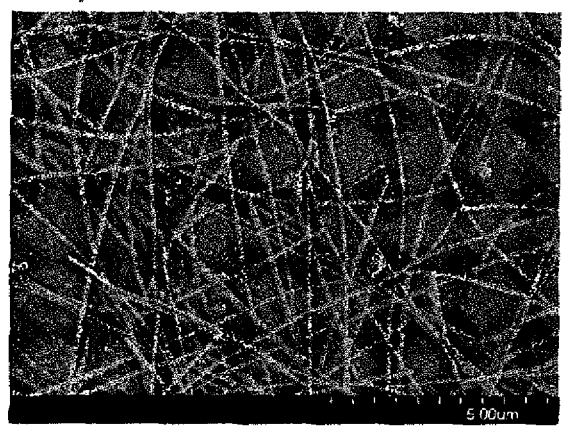
[Fig.15]
Example 9
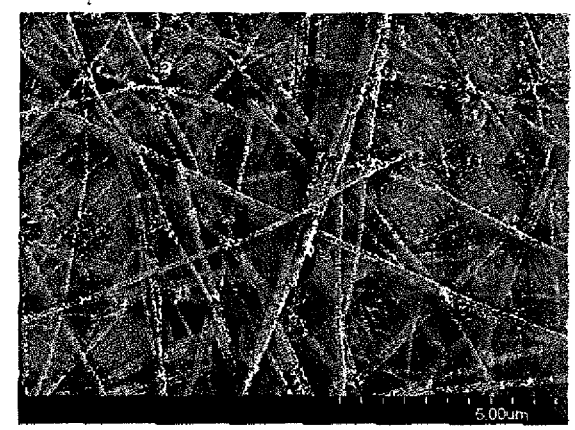

[Fig.16]
Comparative Example 7
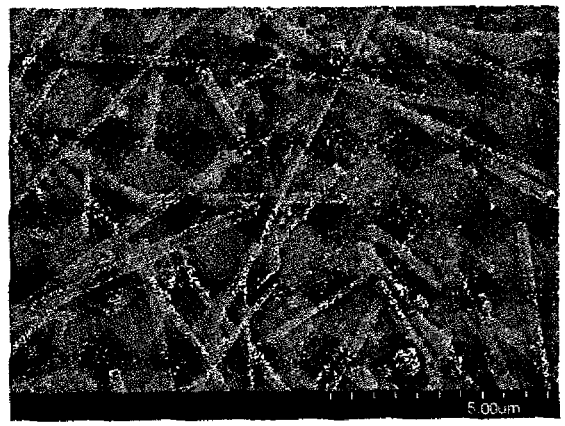
[Fig.17]
Comparative Example 8
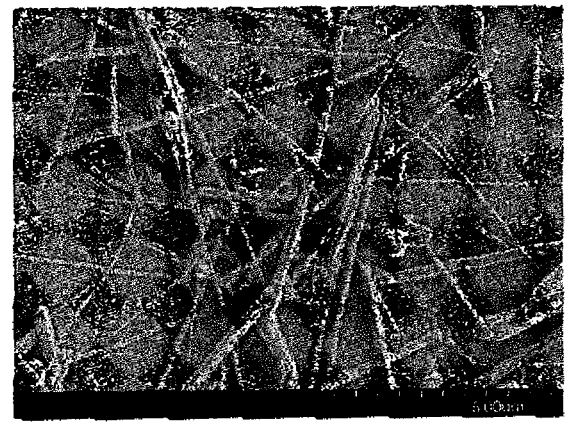

SILVER NANOWIRE PRODUCTION METHOD

TECHNICAL FIELD

The present invention relates to a method for producing silver nanowires that are useful as a conductive filler constituting a transparent conductor.

BACKGROUND ART

"Silver nanowires", which are fine silver particles having a linear shape, are expected as a conductive filler for imparting conductivity to a transparent resin. Silver nanowires mixed in a resin form a conductive network through contact thereof with each other, and thereby the use of a transparent resin can realize a transparent conductor that achieves both transparency and conductivity. For a transparent conductive material, a metal oxide film represented by ITO has been mainly used for such purposes as a transparent electrode and the like. However, a metal oxide film has defects including the high film forming cost, the low resistance to bending, which may prevent the final product becoming flexible, and the like. A transparent conductor using silver nanowires as a conductive filler overcomes the defects that are peculiar to a metal oxide film.

A known production method of silver nanowires include a method of dissolving a silver compound in a polyol solvent, such as ethylene glycol, and precipitating silver particles having a linear shape by utilizing the reduction power of the polyol as the solvent in the presence of a halogen compound and PVP (polyvinylpyrrolidone) as a protective agent (PTLs 1 and 2 and NPL 1).

CITATION LIST

Patent Literatures

PTL 1: US 2005/0056118
PTL 2: US 2008/0003130

Non-Patent Literature

NPL 1: J. of Solid State Chem., 1992, 100, 272-280

SUMMARY OF INVENTION

Technical Problem

According to the known methods, particles of silver nanowires that are protected with PVP on the surface thereof are obtained. PVP is an extremely useful substance for producing silver nanowires with good yield. Under the current circumstances, there is no method established for producing silver nanowires in high yield suitable for industrial production by using an organic protective agent other than PVP. For example, the use of an alkylated PVP instead of PVP forms deposited silver particles, most of which are in a granular shape, thereby decreasing largely the yield of silver nanowires.

The dispersibility of silver nanowires in a liquid medium or a resin largely depends on the kind of the protective agent. Accordingly, it is considered that the degree of freedom in selection of the liquid medium or the resin, in which silver nanowires are to be dispersed, can be largely enhanced only by enabling the use, for example, of an alkylated PVP and a PVP-PVA (polyvinyl alcohol) graft copolymer as a part or the whole of the protective agent. The invention is to provide a production technique of silver nanowires, exhibiting a yield enhancement effect for a protective agent other than PVP.

Solution to Problem

The present inventors have found that the addition of aluminum nitrate to an alcohol solvent is effective for promoting the formation of silver particles in a wire form. The invention has been completed based on the knowledge.

The object can be achieved by a method for producing silver nanowires, containing precipitating a silver linear structure (which is referred to as "silver nanowires") in an alcohol solvent having a silver compound, a halogen compound, and an organic protective agent dissolved therein, a deposition reaction of silver being performed in a state where aluminum nitrate is further dissolved in the solvent. For enhancing the yield, it is effective that the total amount of aluminum nitrate dissolved in the solvent is from 0.01 to 0.50 in terms of Al/Ag molar ratio with respect to the total amount of the silver compound. The organic protective agent is, for example, a copolymer having a polymerization composition of 100 parts by mass of vinylpyrrolidone and from 1 to 12 parts by mass of an additional monomer. The organic protective agent used may be one containing one or more kinds of alkylated PVP, a PVP-PVA graft copolymer, and vinyl acetate. The temperature on the deposition reaction may be, for example, from 60 to 185° C. The "PVP-PVA graft copolymer" herein is a graft copolymer that contains a PVP chain and a PVA chain bonded to each other. Thus, the organic protective agent may be constituted by an organic compound except for PVP. PVP and an alkylated PVP are different substances from each other.

Advantageous Effects of Invention

According to the invention, such a technique is provided that exhibits an effect on the enhancement of the yield of silver nanowires even in the case where an organic protective agent other than PVP is used. Thus, the invention contributes to practice of industrial production of silver nanowires having an organic protective agent other than PVP on the surface thereof. It is expected that in the future, the kind of organic protective agents capable of being applied is enhanced by applying the invention, and associated thereto, the degree of freedom in selection of the dispersion medium used for storing or transporting silver nanowires and the transparent resin, in which silver nanowires are to be mixed as a conductive filler, is enhanced, thereby enhancing the degree of freedom in design of a product using a transparent conductor.

BRIEF DESCRIPTION OF DRAWINGS

FIG. 1 is an SEM micrograph of the silver nanowires obtained in Example 1.
FIG. 2 is an SEM micrograph of the silver nanowires obtained in Example 2.
FIG. 3 is an SEM micrograph of the silver nanowires obtained in Example 3.
FIG. 4 is an SEM micrograph of the silver nanowires obtained in Example 4.
FIG. 5 is an SEM micrograph of the silver nanowires obtained in Example 5.
FIG. 6 is an SEM micrograph of the silver nanowires obtained in Example 6.

FIG. 7 is an SEM micrograph of the silver nanowires obtained in Example 7.

FIG. 8 is an SEM micrograph of the silver nanowires obtained in Comparative Example 1.

FIG. 9 is an SEM micrograph of the silver nanowires obtained in Comparative Example 2.

FIG. 10 is an SEM micrograph of the silver nanowires obtained in Comparative Example 3.

FIG. 11 is an SEM micrograph of the silver nanowires obtained in Comparative Example 4.

FIG. 12 is an SEM micrograph of the silver nanowires obtained in Comparative Example 5.

FIG. 13 is an SEM micrograph of the silver nanowires obtained in Comparative Example 6.

FIG. 14 is an SEM micrograph of the silver nanowires obtained in Example 8.

FIG. 15 is an SEM micrograph of the silver nanowires obtained in Example 9.

FIG. 16 is an SEM micrograph of the silver nanowires obtained in Comparative Example 7.

FIG. 17 is an SEM micrograph of the silver nanowires obtained in Comparative Example 8.

DESCRIPTION OF EMBODIMENTS

Size of Silver Nanowires

The silver nanowires that are applied to the invention have an average length of 3 μm or more and an average width of 500 nm or less. The silver nanowires are linear structures, and the respective linear structures each are referred to as a "particle" herein. The maximum line segment that connects two points on the surface of the particle is defined as a "long axis", and the length of the long axis is referred to as a "length" of the particle. The direction in parallel to the long axis is referred to as a "long axis direction", and the length of the particle in the direction perpendicular to the long axis direction at the position having the longest length of the particle is referred to as a "width" of the particle. In the aggregate of the particles (i.e., the powder), the average values of the "length" and the "width" of the respective particles are referred to as an "average length" and an "average width", respectively.

transparent conductor is produced by mixing silver nanowires in a transparent resin, it is necessary that a conductive network is formed through contact of the silver nanowire particles with each other, and a light path is ensured through gaps among the silver nanowire particles. The wire length is advantageously larger from the standpoint of the formation of the conductive network. However, when the wire length is excessively large, the wires may be entangled to form a flocculate, which adversely affect the transparency. When the wire width is excessively small, on the other hand, it is disadvantageous in ensuring the conductivity. When the wire width is excessively large, on the contrary, it is disadvantageous in ensuring the transparency. As a result of various investigations, the average length of the silver nanowires is desirably from 3 to 500 μm, and more preferably from 5 to 300 μm. The average width of the silver nanowires is desirably from 10 to 500 nm, and more preferably from 10 to 200 nm. The silver nanowires having such a particle size can be obtained by the production method described later.

The particle size of the silver nanowires can be measured from an electron micrograph. Specifically, the lengths and the widths of the respective particles can be measured with an SEM (scanning electron microscope) micrograph of the silver nanowire aggregate (powder). For calculating the average length and the average width, the total number of the particles to be measured is 100 or more.

Wire Yield

In the production of the silver nanowires, the ratio of the number of particles that exhibit the prescribed wire shape in the silver particles obtained through reduction deposition of silver is calculated as a "wire yield", which may be used as an index of the evaluation of productivity. The wire yield can be obtained with an electron micrograph of the resulting aggregate (powder) of silver particles. Specifically, an SEM micrograph of the resulting silver particle aggregate is obtained, the total number $n_0$ of the silver particles imaged in the SEM micrograph and the number $n_1$ of the silver particles that apparently exhibit the prescribed wire shape (length: 3 to 500 μm, width: 10 to 200 nm) are obtained, and the wire yield is calculated according to the following expression (1).

$$\text{(wire yield (\%))} = n_1/n_0 \times 100 \tag{1}$$

The wire yield is an index for comparing the productivity among production charges (i.e., to what extent the production condition is suitable for forming particles in a wire form), and it can be determined that a larger wire yield means that the production condition is suitable for forming particles in a wire form. The counting methods for $n_0$ and $n_1$ are based on the same measurement standard, for enabling appropriate comparison of the productivity among the production charges. The SEM micrograph for the measurement preferably includes micrographs of plural view fields that are arbitrarily selected, and the total number of the particles to be measured (population) is preferably 100 or more.

Alcohol Solvent

In the invention, such a measure is applied that in an alcohol solvent, silver is deposited by utilizing the reduction power of the alcohol. The kind of the alcohol may be selected in such a manner that the alcohol has suitable reduction power to silver, and is capable of precipitating silver particles in a wire form. Under the current situation, it has been said that a polyol, which is represented by ethylene glycol, is relatively suitable for the formation of silver nanowire.

Silver Compound

A silver compound that is soluble in the solvent is used as a silver source for the reduction deposition of silver nanowires. Examples thereof include silver nitrate, silver acetate, silver oxide, and silver chloride, and silver nitrate ($AgNO_3$) is conveniently used in consideration of the solubility in the solvent and the cost. The amount of Ag added to the total amount of the alcohol solvent used may be in a range of from 0.001 to 0.1 mol of Ag, and more preferably in a range of from 0.025 to 0.075 mol of Ag, per 1 L of the solvent.

Halogen Compound

For preforming the reduction deposition reaction of silver, the presence of a halogen ion is necessary in a solution. It is considered that a halogen ion quickly etches the particular crystal plane of metallic silver nucleated to facilitate formation of multiple twinning, thereby enhancing the proportion of the crystal nuclei forming the wires. The halogen ion source used may be a halogen compound that is soluble in the alcohol solvent, such as CTAB (cetyltrimethylammonium bromide, ($C_{16}H_{33}$)N($CH_3$)$_3$Br), TBAC (tetrabutylammonium chloride, ($CH_3CH_2CH_2CH_2$)$_4$NCl), sodium chloride (NaCl), potassium chloride (KCl), and hydrochloric acid (HCl). The amount of the halogen added based on the total amount of the alcohol solvent used may be in a range of from 0.0001 to 0.01 mol, and more preferably in a range of from 0.0005 to 0.005 mol, per 1 L of the solvent.

Organic Protective Agent

The organic protective agent has a function of covering the surface of silver particles deposited through the reduction reaction and preventing the silver particles from growing to coarse silver particles. The organic protective agent present on the surface of the resulting silver particles has a function of ensuring the dispersibility thereof in a dispersion medium (such as a liquid for storage, and a resin constituting a transparent conductor). In the case where silver fine powder formed of silver nanoparticles having an approximately spherical shape is produced, various compounds including oleylamine have been known as the applicable organic protective agent. However, although PVP (polyvinylpyrrolidone) has been known as an organic protective agent that is effective for synthesizing silver nanowires, which are linear structures, through the preferential growth in only one direction in the deposition of silver, it is the current situation that no practical organic protective agent other than PVP has not yet been found that is suitable for producing silver nanowires stably with good yield.

As described later, the inventors have found that the kind of the organic protective agent enabling the production of silver nanowires is enhanced by dissolving aluminum nitrate in the solvent, in which the deposition reaction is performed. For example, even by using an alkylated PVP instead of PVP, silver nanowires can be produced with relatively good yield. The alkylated PVP used may be one having an alkyl group addition amount of from 10 to 70% by mass. In particular, an alkylated PVP having a weight-average molecular weight of 55,000±5,000 is preferred. The alkylated PVP may be used solely or may be used after mixing with PVP at an arbitrary ratio. A "PVP-PVA graft copolymer", which is synthesized through copolymer formation with PVP and PVA (polyvinyl alcohol), may also be used. In this case, the ratio of PVA in the PVP-PVA graft copolymer may be from 1 to 12% by mass, and more effectively from 1 to 7% by mass. It is expected that the kind of the applicable organic protective agents may be enhanced by the future researches. The amount of the organic protective agent may be controlled to a range of from 50 to 1,500 g per 1 mol of Ag, and more preferably in a range of from 100 to 500 g per 1 mol of Ag.

Aluminum Nitrate

The production method according to the invention has such a feature that aluminum nitrate is dissolved in the solvent, in which silver is deposited. As a result of various investigations made by the inventors, such a phenomenon has been found that when the reduction deposition reaction of silver is performed in an alcohol solvent in the presence of aluminum nitrate, silver particles in a wire form are liable to be formed even by using a substance other than PVP as an organic protective agent. While the mechanism of the phenomenon is unclear under the current situation, it is considered that since the ratio of particles in a wire form present (i.e., the wire yield) is enhanced by adding aluminum in the form of a nitrate salt, aluminum nitrate dissolved in the solvent has a function of promoting the formation of multiple twinning, which is effective as a crystal nucleus for growing the linear structures. Furthermore, it is expected that aluminum nitrate has a function of activating the crystal plane for growing the silver particle into a wire form, and a function of enhancing the reduction rate. In the case where an aluminum salt other than aluminum nitrate is used, a good result is not necessarily obtained under the current situation.

Aluminum nitrate may be added in the form of aluminum nitrate nonahydrate Al $(NO_3)_3 \cdot 9H_2O$. When the amount of aluminum present in the solvent is small, the effect of improving the wire yield may be insufficient. As a result of various investigations, for enhancing the wire yield, the molar ratio of the total amount of Al and the total amount of Ag present in the total solvent subjected to the reaction (which is referred to as an "Al/Ag molar ratio" in the description herein) is desirably 0.01 or more, and more effectively 0.014 or more. However, excessive addition of aluminum nitrate not only is uneconomical, but also may be a factor of promoting of the increase of the wire width and decreasing the transparency in the production of a transparent conductor, and therefore the Al/Ag molar ratio is desirably controlled to a range of 0.50 or less, and may be managed to 0.40 or less.

Production Method

A method of reduction depositing metallic silver in an alcohol solvent having a silver compound dissolved therein, through the reduction power of the alcohol as the solvent in the presence of a halogen compound and an organic protective agent, thereby providing silver nanowires as linear structures has been known. In this case, it is said that PVP is suitable as the organic protective agent for depositing silver particles in a wire form. In the invention, silver nanowires are formed by utilizing the reduction power of the alcohol solvent. In the invention, however, aluminum nitrate is dissolved in the alcohol solvent. According to the procedure, silver particles in a wire form are liable to be formed even by using an organic protective agent other than PVP, and thus the degree of freedom in selection of the organic protective agent is increased.

The temperature where the reduction deposition reaction of silver is performed may be set in a range of 60° C. or more and the boiling point of the solvent used or less. In the case where ethylene glycol is used as the solvent, the temperature is preferably from 60 to 185° C., and more preferably from 85 to 160° C., and may be managed in a range of from 100 to 160° C. The reaction time may be in a range of from 10 to 720 minutes. The amounts of the substances present in the solvent may be set in the ranges described above.

It is preferred that the substances except for the silver compound are dissolved in the alcohol solvent, and after the temperature of the solvent twhich is hereinafter referred to as a solution A) reaches the prescribed reaction temperature, the silver compound is added to the solution A. The silver compound may be added in such a manner that the silver compound is dissolved in an alcohol solvent of the same kind as the aforementioned solvent in advance in a separate vessel, and the silver-containing liquid (which is hereinafter referred to as a solution B) is mixed in the solution A. The solution B before mixing in solution A preferably has a temperature around ordinary temperature (for example, from 15 to 40° C.). When the temperature of the solution B is too low, a long period of time may be required for dissolving the silver compound, and when the temperature thereof is too high, the reduction reaction of silver tends to occur before the step of mixing in the solution A due to the reduction power of the alcohol solvent in the solution B. A silver compound that is easily dissolved in the alcohol solvent, such as silver nitrate, may be added in the form of solid to the solution A. The method of adding the silver compound may be a method of adding the entire amount thereof at one time, and a method of adding intermittently or continuously over a certain period of time. The liquid is continuously stirred while the reaction proceeds. The atmosphere of the gas phase in contact with the liquid surface of the solution A while the reaction proceeds may be the air atmosphere or nitrogen.

After completing the deposition reaction of silver, a slurry containing silver nanowires is subjected to solid-liquid separation by such a measure as centrifugal separation or decantation, so as to recover the solid matter, which is then washed. The solid matter after washing contains mainly the particles of the silver nanowires having the organic protective agent on the surface thereof. The aggregate of silver nanowires (powder) may be stored in the form of a dispersion liquid containing the silver nanowires dispersed in a suitable solvent depending on the purpose. The silver nanowire dispersion liquid may be utilized as a supply source of silver nanowires in various purposes. For example, the silver nanowires in the dispersion liquid may be mixed as a conductive filler into a transparent resin, so as to constitute a transparent conductor.

EXAMPLE

Example 1

Ethylene glycol as the alcohol solvent, silver nitrate as the silver compound, sodium chloride as the halogen compound, aluminum nitrate nonahydrate as aluminum nitrate, and an alkylated PVP (GANEX P-904LC, produced by ISP Technologies, Inc., weight-average molecular weight: 19,000) as the organic protective agent were prepared.

2.80 g of the alkylated PVP, 0.0035 g of sodium chloride, and 0.056 g of aluminum nitrate nonahydrate were dissolved in 80 mL of ethylene glycol to provide a solution A. In a separate vessel, 0.85 g of silver nitrate was dissolved in 20 mL of ethylene glycol to provide a solution B. In this example, the Al/Ag molar ratio is 0.030. The total amount of the solution A was heated from ordinary temperature to 145° C. under stirring, and then the total amount of the solution B was added to the solution A over 1 hour. During the addition, the solution A was retained at 145° C. under stirring. The temperature of the solution B added was ordinary temperature. After completing the addition of the solution B, the temperature was retained at 145° C. for 2 hours under continuously stirring. It was considered that the deposition reaction of silver was started by adding the solution B, and the deposition reaction of silver was substantially completed during the retention at 145° C. for 3 hours in total under stirring. The liquid surface of the solution A was the air atmosphere during heating and performing the deposition reaction. After 3 hours from the start of addition of the solution B, the resulting liquid in the form of a slurry (reaction liquid) was cooled to 25° C. The reaction liquid after cooling was subjected to centrifugal separation under a condition of 1,000 rpm and 10 minutes, and thereby the supernatant was removed to recover the solid matter. Thereafter, a washing operation, in which IPA (isopropyl alcohol) was added to the solid matter to prepare a dispersion liquid, and the dispersion liquid was subjected to solid-liquid separation to recover a solid matter, was repeated three times. IPA was added to the solid matter after washing to provide a silver particle dispersion liquid. A specimen was collected from the dispersion liquid, from which IPA as the solvent was evaporated on an observation stand, and was observed with an SEM to provide an SEM micrograph of the resulting silver particles. FIG. 1 exemplifies the SEM micrograph.

The wire yield was obtained based on the SEM micrograph, according to the expression (1) by the method described above. At this time, all the silver particles observed in three view fields arbitrarily selected were measured. The total number of the objects to be measured was 100 or more. The same measurement method of the wire yield is applied to the following examples.

In this example, the Al/Ag molar ratio was 0.030, and a good wire yield of 83% was obtained.

Example 2

A silver particle dispersion liquid was obtained in the same conditions as in Example 1 except that the amount of aluminum nitrate nonahydrate added was changed to 0.028 g, and the total amount of the solution A was heated from ordinary temperature to 130° C. under stirring. FIG. 2 exemplifies the SEM micrograph of the resulting silver particles.

In this example, the Al/Ag molar ratio was 0.015, and a good wire yield of 82% was obtained.

Example 3

0.56 g of the alkylated PVP, 0.0007 g of sodium chloride, and 0.011 g of aluminum nitrate nonahydrate were dissolved in 16 mL of ethylene glycol to provide a solution A. In a separate vessel, 0.17 g of silver nitrate was dissolved in 4 mL of ethylene glycol to provide a solution B. A silver particle dispersion liquid was obtained in the same conditions as in Example 1 except that the solutions A and B were used. FIG. 3 exemplifies the SEM micrograph of the resulting silver particles.

In this example, the Al/Ag molar ratio was 0.030, and a good wire yield of 90% was obtained.

Example 4

A silver particle dispersion liquid was obtained in the same conditions as in Example 3 except that the amount of aluminum nitrate nonahydrate added was changed to 0.022 g. FIG. 4 exemplifies the SEM micrograph of the resulting silver particles.

In this example, the Al/Ag molar ratio was 0.060, and a good wire yield of 87% was obtained.

Example 5

A silver particle dispersion liquid was obtained in the same conditions as in Example 3 except that the amount of aluminum nitrate nonahydrate added was changed to 0.045 g. FIG. 5 exemplifies the SEM micrograph of the resulting silver particles.

In this example, the Al/Ag molar ratio was 0.119, and a good wire yield of 77% was obtained.

Example 6

A silver particle dispersion liquid was obtained in the same conditions as in Example 3 except that the amount of aluminum nitrate nonahydrate added was changed to 0.090 g. FIG. 6 exemplifies the SEM micrograph of the resulting silver particles.

In this example, the Al/Ag molar ratio was 0.239, and a good wire yield of 85% was obtained.

Example 7

A silver particle dispersion liquid was obtained in the same conditions as in Example 3 except that the amount of aluminum nitrate nonahydrate added was changed to 0.134 g. FIG. 7 exemplifies the SEM micrograph of the resulting silver particles.

In this example, the Al/Ag molar ratio was 0.358, and a good wire yield of 79% was obtained.

Comparative Example 1

A silver particle dispersion liquid was obtained in the same conditions as in Example 1 except that the amount of aluminum nitrate nonahydrate added was changed to 0 g (not added). FIG. 8 exemplifies the SEM micrograph of the resulting silver particles.

In this example, the Al/Ag molar ratio was 0 since aluminum nitrate was not added, and a poor wire yield of 16% was obtained.

Comparative Example 2

A silver particle dispersion liquid was obtained in the same conditions as in Example 1 except that the amount of aluminum nitrate nonahydrate added was changed to 0.014 g. FIG. 9 exemplifies the SEM micrograph of the resulting silver particles.

In this example, the Al/Ag molar ratio was as small as 0.007 since the amount of aluminum nitrate added was too small, and thus a poor wire yield of 9% was obtained.

Comparative Example 3

A silver particle dispersion liquid was obtained in the same conditions as in Example 4 except that 0.022 g of aluminum sulfate hydrate $Al_2(SO_4)_3 \cdot xH_2O$ was added instead of aluminum nitrate nonahydrate. FIG. 10 exemplifies the SEM micrograph of the resulting silver particles.

In this case, a poor wire yield of 14% was obtained.

Comparative Example 4

A silver particle dispersion liquid was obtained in the same conditions as in Example 4 except that 0.022 g of aluminum chloride hexahydrate $AlCl_3 \cdot 6H_2O$ was added instead of aluminum nitrate nonahydrate. FIG. 11 exemplifies the SEM micrograph of the resulting silver particles.

In this case, a poor wire yield of 8% was obtained.

Comparative Example 5

A silver particle dispersion liquid was obtained in the same conditions as in Example 4 except that 0.022 g of aluminum isopropoxide $Al(OCH(CH_3)_2)_3$ was added instead of aluminum nitrate nonahydrate. FIG. 12 exemplifies the SEM micrograph of the resulting silver particles.

In this case, a poor wire yield of 13% was obtained.

Comparative Example 6

A silver particle dispersion liquid was obtained in the same conditions as in Example 4 except that 0.022 g of monobasic ammonium phosphate $Al(H_2PO_4)_3$ was added instead of aluminum nitrate nonahydrate. FIG. 13 exemplifies the SEM micrograph of the resulting silver particles.

In this case, the wire yield was 0%, and no particle in a wire form was formed.

Example 8

Ethylene glycol as the alcohol solvent, silver nitrate as the silver compound, sodium chloride as the halogen compound, aluminum nitrate nonahydrate as aluminum nitrate, and a PVP-PVA graft copolymer having a PVA ratio of 2% by mass as the organic protective agent were prepared.

0.56 g of the PVP-PVA graft copolymer, 0.0007 g of sodium chloride, and 0.04 g of aluminum nitrate nonahydrate were dissolved in 20 mL (22.4 g) of ethylene glycol to provide a solution A. The total amount of the solution A was heated from ordinary temperature to 175° C. under stirring, and then after retaining at 145° C. under continuously stirring for 30 minutes, 0.17 g of silver nitrate in the form of solid was added at one time to the solution A. The Al/Ag molar ratio is 0.12. Thereafter, the solution was retained at 175° C. under continuously stirring for 20 minutes, and then the resulting liquid in the form of a slurry (reaction liquid) was cooled to 25° C. It was considered that the deposition reaction of silver was substantially completed during the retention at 175° C. for 50 minutes in total under stirring. The liquid surface of the solution A is the air atmosphere during heating and performing the deposition reaction. The reaction liquid after cooling was subjected to centrifugal separation under a condition of 3,000 rpm and 10 minutes, and thereby the supernatant was removed to recover the solid matter. Thereafter, a washing operation, in which IPA (isopropyl alcohol) was added to the solid matter to prepare a dispersion liquid, and the dispersion liquid was subjected to solid-liquid separation to recover a solid matter, was repeated three times. IPA was added to the solid matter after washing to provide a silver particle dispersion liquid. A specimen was collected from the dispersion liquid, from which IPA as the solvent was evaporated on an observation stand, and was observed with an SEM to provide an SEM micrograph of the resulting silver particles. FIG. 14 exemplifies the SEM micrograph.

A good wire yield of 92% was obtained.

Example 9

A silver particle dispersion liquid was obtained in the same conditions as in Example 8 except that 0.56 g of a VP (vinylpyrrolidone)-vinyl acetate random copolymer was added instead of the PVP-PVA graft copolymer. FIG. 15 exemplifies the SEM micrograph of the resulting silver particles.

A good wire yield of 72% was obtained.

Comparative Example 7

A silver particle dispersion liquid was obtained in the same conditions as in Example 8 except that the amount of aluminum nitrate nonahydrate added was changed to 0 g (not added). FIG. 16 exemplifies the SEM micrograph of the resulting silver particles.

The wire yield was 62%, which was lower than Example 8.

Comparative Example 8

A silver particle dispersion liquid was obtained in the same conditions as in Example 9 except that the amount of aluminum nitrate nonahydrate added was changed to 0 g (not added). FIG. 17 exemplifies the SEM micrograph of the resulting silver particles.

The wire yield was 65%, which was lower than Example 9.

As described above, it was confirmed that by adding the prescribed amount of aluminum nitrate, silver nanowires were obtained with high wire yield even in the case where an organic protective agent other than PVP was used.

The invention claimed is:

1. A method for producing silver nanowires, comprising reduction depositing a silver linear structure as silver nanowires in an alcohol solvent, the alcohol solvent including a silver compound, a halogen compound, and an organic protective agent dissolved therein, wherein a reductive deposition reaction of silver in the reduction deposition step is performed in a state where aluminum nitrate in an amount of 0.01 to 0.50 in terms of an $Al^{3+}/Ag^{+}$ molar ratio with respect to the total amount of the silver compound, is further dissolved in the alcohol solvent.

2. The method for producing silver nanowires according to claim 1, wherein the organic protective agent is a copolymer of vinylpyrrolidone and an additional monomer.

3. The method for producing silver nanowires according to claim 1, wherein the organic protective agent is a copolymer having a polymerization composition of 100 parts by mass of vinylpyrrolidone and from 1 to 12 parts by mass of an additional monomer.

4. The method for producing silver nanowires according to claim 1, wherein the organic protective agent is one containing one or more kinds of alkylated PVP, a PVP-PVA graft copolymer, and vinyl acetate.

5. The method for producing silver nanowires according to claim 1, wherein the reductive deposition reaction is performed at a temperature in a range of from 60° C. to 185° C.

* * * * *